(12) United States Patent
DeArmond

(10) Patent No.: US 10,766,121 B2
(45) Date of Patent: Sep. 8, 2020

(54) SYSTEM AND METHOD FOR MOUNTING CARPENTER LEVELS

(71) Applicant: HANDY TOOLS LLC, Silver Spring, FL (US)

(72) Inventor: Keith DeArmond, Silver Springs, FL (US)

(73) Assignee: Handy Tools, LLC, Silver Springs, FL (US)

( * ) Notice: Subject to any disclaimer, the term of this patent is extended or adjusted under 35 U.S.C. 154(b) by 52 days.

(21) Appl. No.: 16/172,713

(22) Filed: Oct. 26, 2018

(65) Prior Publication Data

US 2020/0130144 A1    Apr. 30, 2020

(51) Int. Cl.
| | |
|---|---|
| B25B 5/14 | (2006.01) |
| B25B 5/08 | (2006.01) |
| G01C 9/28 | (2006.01) |
| G01C 9/34 | (2006.01) |
| B25H 1/00 | (2006.01) |
| F16B 2/12 | (2006.01) |

(52) U.S. Cl.
CPC ............... *B25B 5/14* (2013.01); *B25B 5/082* (2013.01); *G01C 9/28* (2013.01); *B25H 1/0085* (2013.01); *F16B 2/12* (2013.01); *G01C 9/34* (2013.01)

(58) Field of Classification Search
CPC .... F16B 2/06; G01C 9/26; G01C 9/28; F16M 11/041; F16M 11/045; F16M 11/105; F16M 11/10; B25B 5/003; B25B 5/101
USPC .......................... 269/41, 45, 71; 33/375, 376
See application file for complete search history.

(56) References Cited

U.S. PATENT DOCUMENTS

| | | | | |
|---|---|---|---|---|
| 478,309 | A * | 7/1892 | Burchinal | G01C 9/24 33/376 |
| 2,101,317 | A * | 12/1937 | Lemieux | E04G 7/14 403/53 |
| 2,154,625 | A * | 4/1939 | Kleineschay | G01C 25/00 73/1.75 |
| 2,165,221 | A * | 7/1939 | Burton | E04G 7/24 403/286 |
| 3,394,389 | A * | 7/1968 | Amir | B25B 5/003 269/84 |
| 4,066,232 | A * | 1/1978 | Hermeyer | G01C 9/28 248/231.51 |
| 4,566,819 | A * | 1/1986 | Johnston | E04G 7/14 403/385 |
| 5,408,752 | A * | 4/1995 | Eadens | G01C 9/26 33/376 |
| 6,601,813 | B1 * | 8/2003 | Kager | A45D 20/12 248/314 |
| D642,040 | S * | 7/2011 | Romine | D8/72 |
| 9,360,155 | B2 * | 6/2016 | Halverson | H04R 1/08 |
| 9,885,571 | B2 * | 2/2018 | Hoppe | G01C 9/26 |
| 10,016,851 | B1 | 7/2018 | Dearmond | |

(Continued)

*Primary Examiner* — Lee D Wilson
*Assistant Examiner* — Seahee Hong
(74) *Attorney, Agent, or Firm* — Chris Tanner; TannerPatent.com FYPA PLLC

(57) ABSTRACT

An improved system and method for clamping of carpenter levels is disclosed. Within the system, it is not necessary to re-size and re-adjust the clamps over and over again as they are re-located. As such, time-consuming repetitive steps are reduced. Additionally, the system can be applied to a variety of clamping surfaces, and can be swiveled to fit at unusual angles.

10 Claims, 17 Drawing Sheets

(56) References Cited

U.S. PATENT DOCUMENTS

| | | | | |
|---|---|---|---|---|
| 2005/0061581 A1* | 3/2005 | Morris | ............... | E04G 1/20 |
| | | | | 182/82 |
| 2005/0217198 A1* | 10/2005 | Carraher | ............ | E04C 5/167 |
| | | | | 52/719 |
| 2011/0146091 A1* | 6/2011 | Spaulding | ............ | G01C 9/26 |
| | | | | 33/372 |
| 2014/0259568 A1* | 9/2014 | Trotsky | ............ | B25B 5/006 |
| | | | | 24/523 |

* cited by examiner sliding the level 105 into the doughnut 112;

ensuring a base of the level 105 is down, and a top of the level 105 is facing up to the thumbwheel 108;

snugging up the thumbwheel 108;

determining a desired angle for attaching the level 105

snapping the round disc on the base of the doughnut 112 into the base of the angle bracket 124;

moving the angle bracket 124 so both brackets are facing the same way and the opening is parallel to the surface being clamped to;

pushing the trigger 160 and then opening/closing the slider 144 until the clamp 102 grasps the specific clamping surface 106 desired to be leveled; and

pushing the trigger 160 until the angle bracket 124 and slider 144 have bottomed out, that is, where the angle bracket 124 and slider cannot move any further.

method of use 300

FIG. 3

STEP 404 positioning the angle bracket 7 and the attached slider over a desired clamping surface 106;

STEP 408 moving the slider 144 toward the clamping surface 106 until it compresses a slider spring 164 that is part of the trigger 160 within the slider 144;

STEP 410 the teeth 140 holding the angle bracket 124 snug against the clamping surface 106;

STEP 412 pulling off the angle bracket 124 using the attached slider 144;

STEP 416 sliding the thick disk 5 into the horseshoe cutout 128;

STEP 418 the locking bump 6 dropping into the concave surface 9

STEP 419 holding the doughnut 4 and angle bracket 11 snug, but still allowing the doughnut 4 to swivel to accept the level 105;

STEP 420 sliding the level 105 into the opening within the doughnut 4;

STEP 421 positioning the bottom of the level 105 next to the base or an attached disk 116 of the doughnut 112;

STEP 422 locating the combination as close to the ends of the level as possible;

STEP 424 adjust the knurled knob 108 downwards until the thrust washer pad 110 is snug against a top surface of the level 105;

STEP 428 Do the same steps above for the other end of the level 105;

STEP 432 rotating the angle bracket 124 and slider 144;

STEP 436 Holding both the level 105 and doughnut 4 with one hand, the other side of level with doughnut 4 with the other hand, positioning the angle bracket 124 and slider 144 over the clamping surface 106; and STEP 437 pushing until the slider 144 "bottoms out" or indicates (gives tactile feedback) that it cannot be moved further.

method of use 400

FIG. 4 separately molding a doughnut, angle bracket, slider, and trigger;

separately molding each of the doughnut, angle bracket, slider, and trigger into two portions (usually halves);

for each of the doughnut, angle bracket, slider, and trigger, pressing the two portions together to form a completed part;

forming the angle bracket to not be in exact halves, but instead having a parting line offset from the center of the resulting angle bracket;

forming the two portions of the angle bracket to not be equal in size, but instead where one portion contain a horseshoe cutout in its entirety, and the other portion does not contain any cutout.

method of manufacture 500

FIG. 5

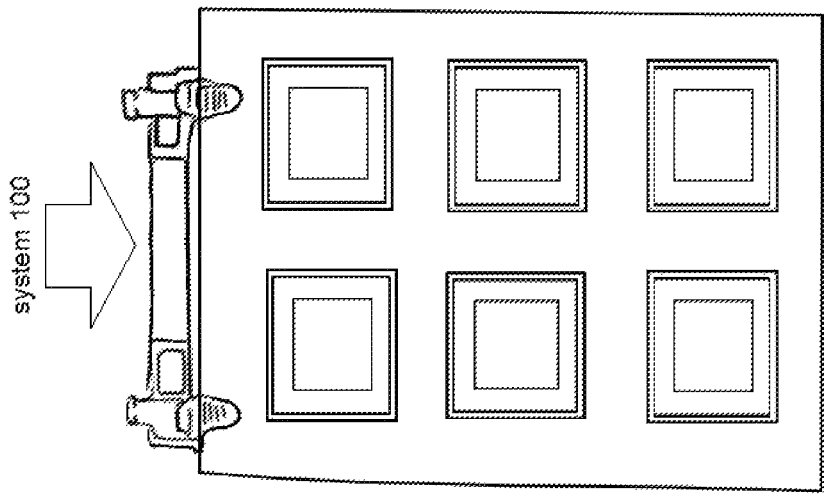
FIG. 14B (top mount)
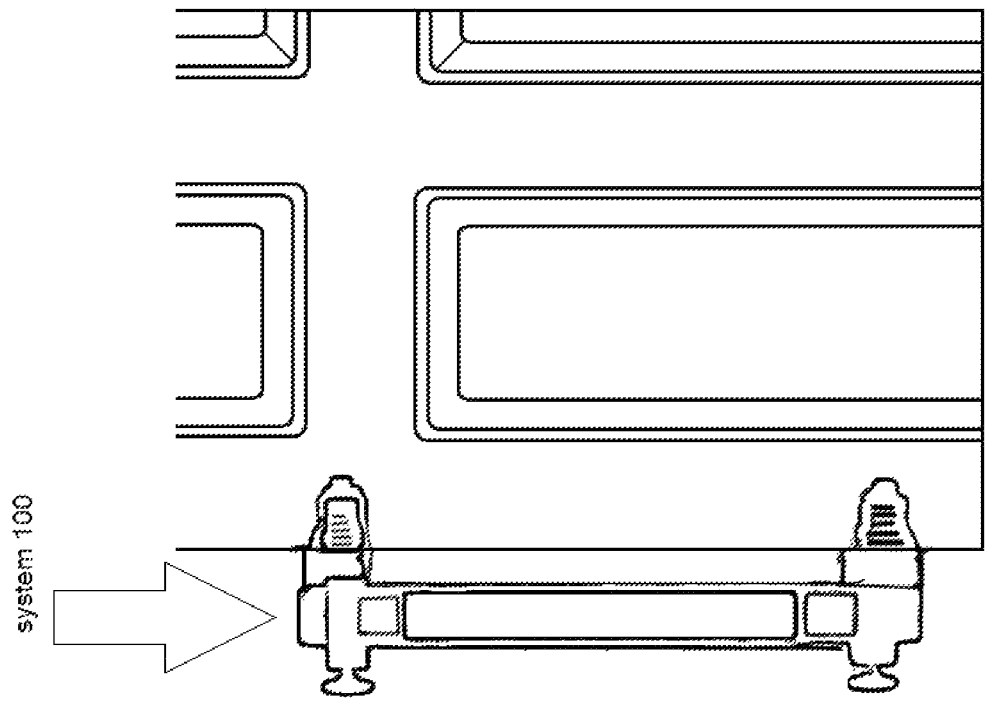
FIG. 14A (side mount)

SYSTEM AND METHOD FOR MOUNTING CARPENTER LEVELS

BACKGROUND OF THE INVENTION

The act of attaching levels to various fixtures can be difficult and time-consuming. In some cases, a person must use one of their hands to hold and secure a level to a desired surface, leaving them only one free hand to operate tools and perform carpentry steps. This can lead to improper readings, resulting in non-level surfaces.

Additionally, persons may be obtaining and assuring level mounting of a group of items, such as 2×4s, in which the sizes of each item to be leveled is the same. In the case of many level-clamping products, the clamps must be removed, and re-sized and re-adjusted over and over again, resulting in time-consuming repetitive steps.

Another adverse condition is cramped conditions, in which carpentry must be performed in spaces that are obstructed or severely constrained.

Consequently, an improved system and method for clamping of levels is desired.

BRIEF DESCRIPTION OF THE DRAWINGS

FIG. 3 shows a method of use of an embodiment;

FIG. 4 shows a more detailed method of use of an embodiment;

FIG. 5 shows a method of manufacture of an embodiment

FIG. 14A shows an embodiment of a system vertically attached to a door;

FIG. 14B shows an embodiment of a system horizontally attached to a door; and

DETAILED DESCRIPTION OF THE PREFERRED EMBODIMENTS

Brief Notes and Glossary

In this application, the level is not directly part of the invention, but for clarity and convenience, will be symbolized with an element number e.g. "level 105". Similarly, the surface being clamped to (a surface or item desired to attach a level to, so as to assure proper level-ness), will sometimes be referred to as "clamping surface 106" or "surface to be leveled 106". This is not to imply that either the level 105 or clamping surface 106 are directly part of the invention, but instead are workpieces. It is not always easy to recognize the various surfaces from the drawings, so some extra labeling is included. These extra notations are included for clarity, and to make the drawings easier to read and understand. Example clamping surfaces 106 can include, but are not limited to, 2×4s, round pipe, PVC pipe, steel pipe, 2" square steel, or ½ inch drywall.

The embodiments herein provide a system and method for attaching an existing, pre-purchased level to a variety of clamping surfaces 106 for which ensuring a level-indication is desired. In an embodiment, a predetermined size limit for clamping surfaces may be up to e.g. 2" thick. However, this disclosure should not be considered as limited exclusively thereto. Other embodiments may apply to surfaces up to e.g. 3" thick or even larger, depending on manufacturing considerations.

Figure 7:
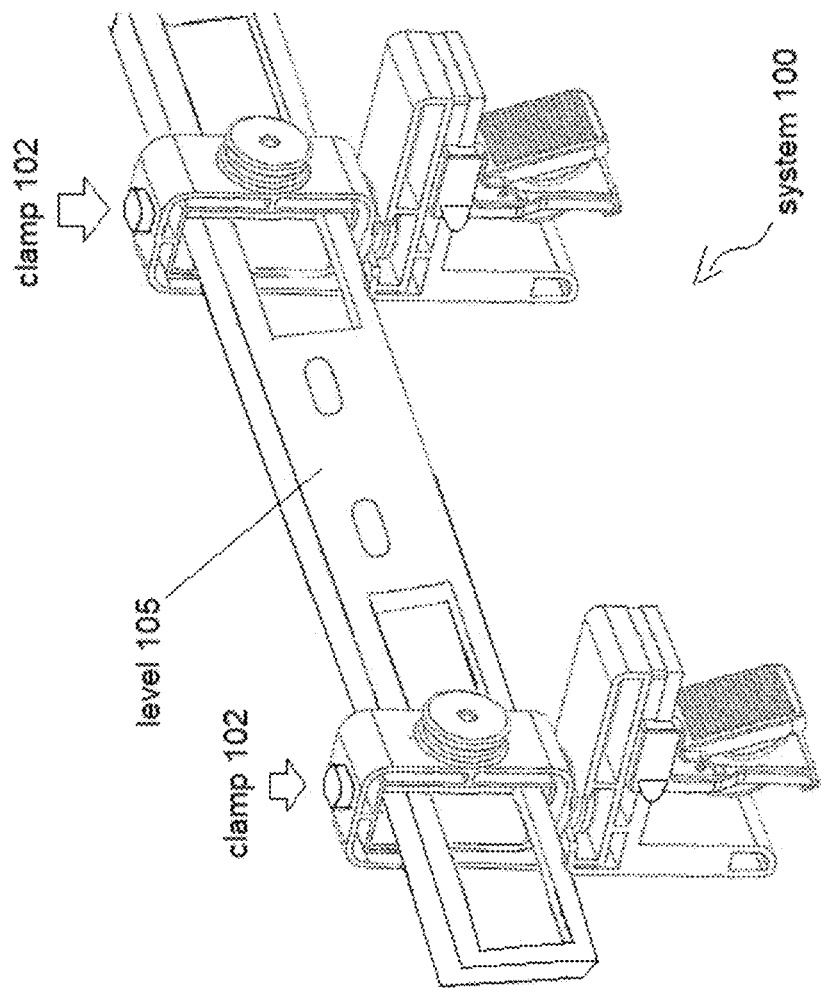
FIG. 7 show an embodiment of a system holding a level.
Figure 11:
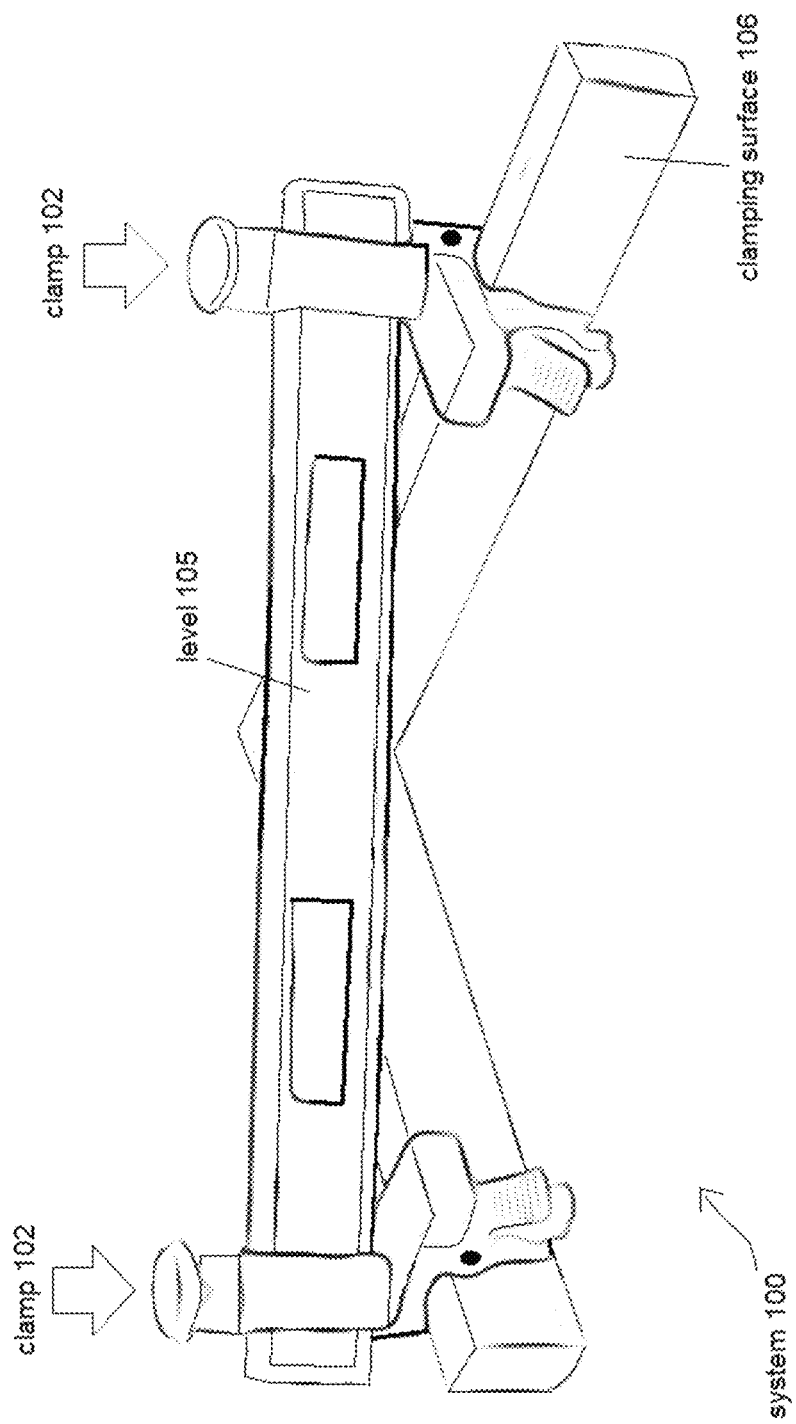
FIG. 11 shows a usage of the system in which the clamps are swiveled.

FIGS. 7 and 11 shows an example arrangement of a system 100, having two clamps 102 holding a level 105, and in FIG. 11 being attached to a clamping surface 106.

Once the clamps 102 are set, the system 100 can be pulled from one clamping surface 106 and then put on another, without removing and re-inserting the level 105. For example, a user wishing to move the system 100 from one 2×4 to another can easily remove the system 100 from the first 2×4, and then merely push it into onto the second 2×4, without having to repeat adjustments.

The system 100 removes a need to hold a level in place with a hand or other attachment mechanism, thereby enabling the user to have full use of the level and both of their hands, simultaneously. The clamping bracket 104 can also swivel, which is useful for lumber that is not perfectly straight at all portions, or where the lumber or workpiece or pipe is irregularly shaped.

Figure 1:
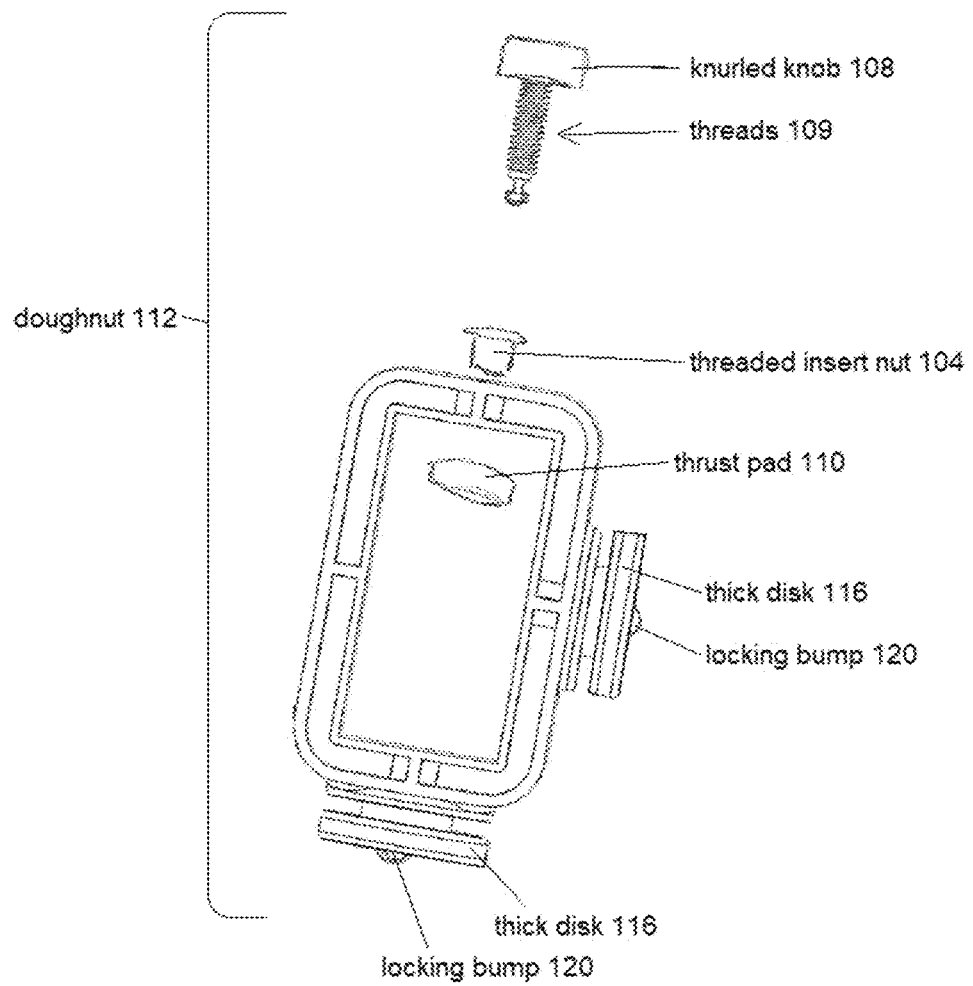
FIG. 1 shows an exploded view of an embodiment of a doughnut.
Figure 2:
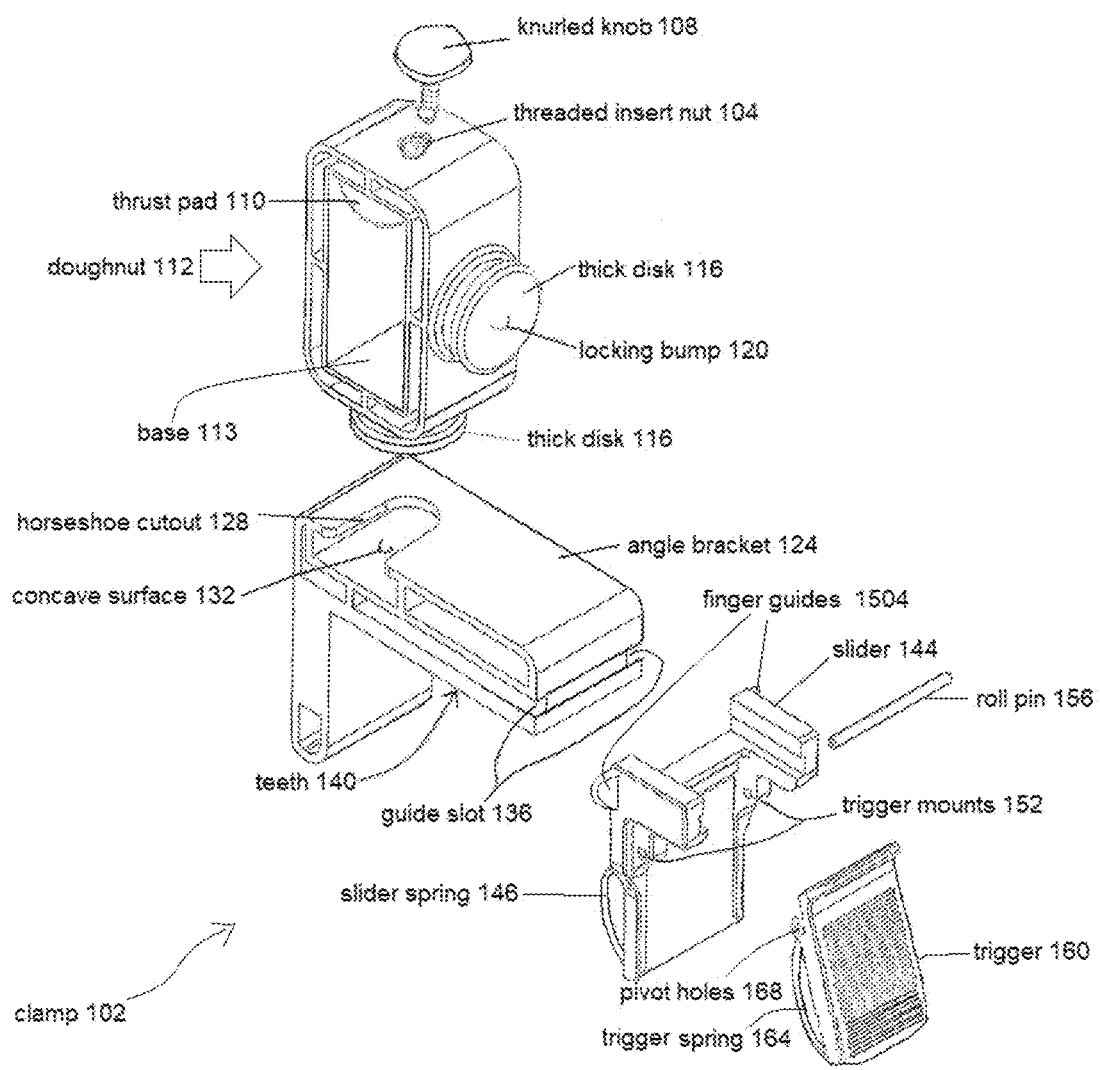
FIG. 2 shows an exploded view of an embodiment of a clamp.

FIGS. 1 and 2 show a base configuration of portions of a single clamp 102. As stated earlier, the clamping system 100 disclosed herein usually comprises a plurality (two or more) clamps 102. A single clamp 102 comprises one or more knurled knobs 108 having threads 109, threaded insert nuts 104, thrust pads 110, doughnuts 112, thick disks 116, locking bumps 120, angle brackets 124, horseshoe cutouts 128, concave surfaces 132, guide slots 136, teeth 140, sliders 144, slider faces 13, trigger mounts 152, roll pins 156, triggers 160, springs 17, and pivot holes 168.

The knurled knob 108 can be made from polymer plastic, and will have a predetermined diameter suitable for being inserted into the horseshoe cutout 128, as will be explained in more detail elsewhere. The knurled knob 108 has a threaded stud having a ball at its end, where the diameter of that ball is smaller than the core diameter of the threaded stud.

The threaded nut 104 is (during use) snapped into place within the doughnut 112. The threaded nut 104 acts to keep the shaft of the knurled knob 108 in place, and ensures smooth operation of the turning the knurled knob 108 and prevents damage to its threads.

The thrust pad 110 can be made from nylon, although other materials may be used as well. The diameter is pre-determined to be suitable for being snapped onto the stud ball 1a of the knurled knob 108, after being threaded into the threaded insert nut 104. The thrust pad 110 has a concave hole specifically machined and configured to accept the stud ball 1a.

The doughnut 112 can be manufactured from, for example, ABS plastic. The dimensions are carefully designed to be suitable for enclosing a variety of sizes of carpentry levels 105, and doing so with the thrust pad 110 in place, thereby holding the level 105 tight against the bottom base of the doughnut 112.

Specifically, a user would adjust the knurled knob 108 to push the thrust pad 110 against the top of the level 105. The top of the doughnut 112 is machined or molded to have an aperture for holding the threaded insert nut 104. In an embodiment, the doughnut 112 is fabricated using a molding process, although other fabrications could also be used. After the doughnut 112 is e.g. molded, the threaded insert nut 104 can be manually snapped therein. As is apparent from either FIG. 1 or 2, the threaded insert nut provides female threads used by the male threads 109 of the knurled knob 108. This matching of threads acts to facilitate the thrust pad 110 to be moved up or down, thereby snugly securing a level 105 against a base 113 of the doughnut 112.

Figure 6A:
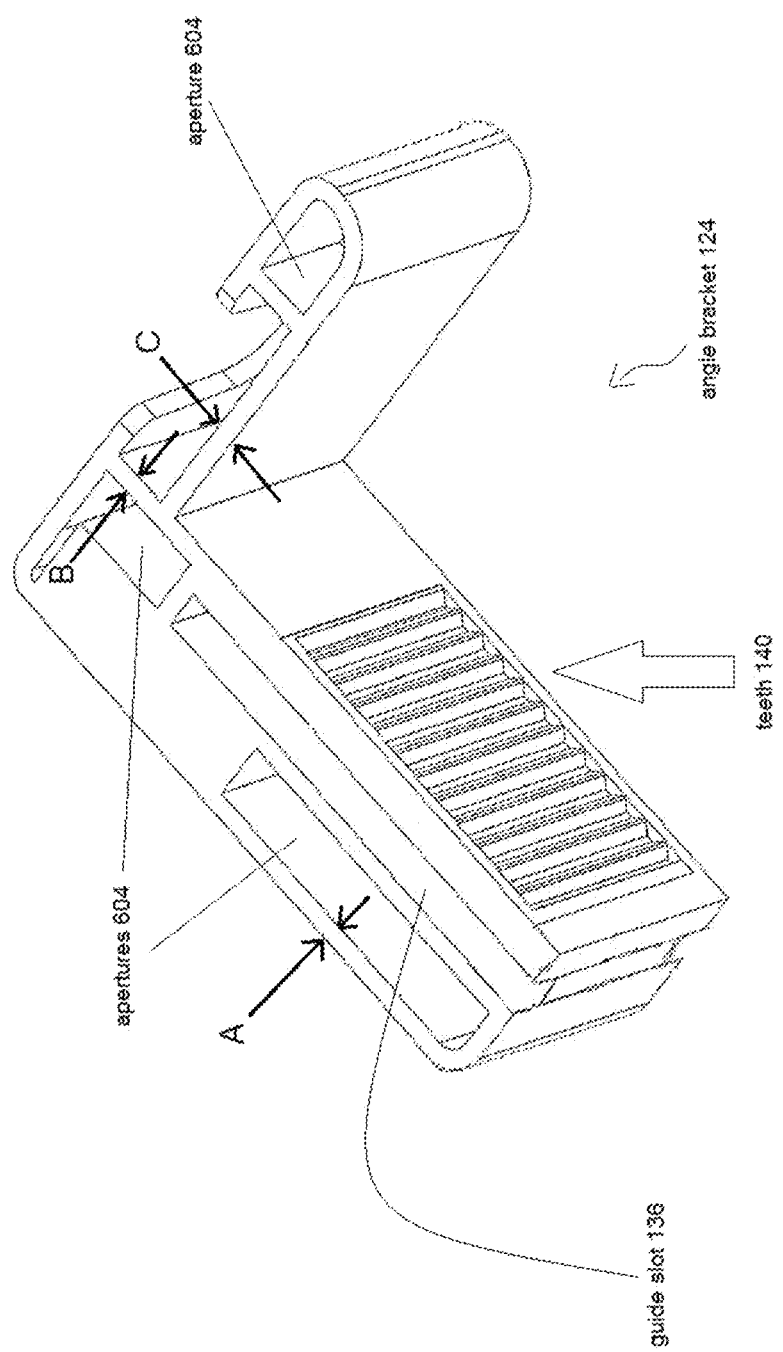
FIGS. 6A and 6B show details of an embodiment of an angle bracket.
Figure 6B:
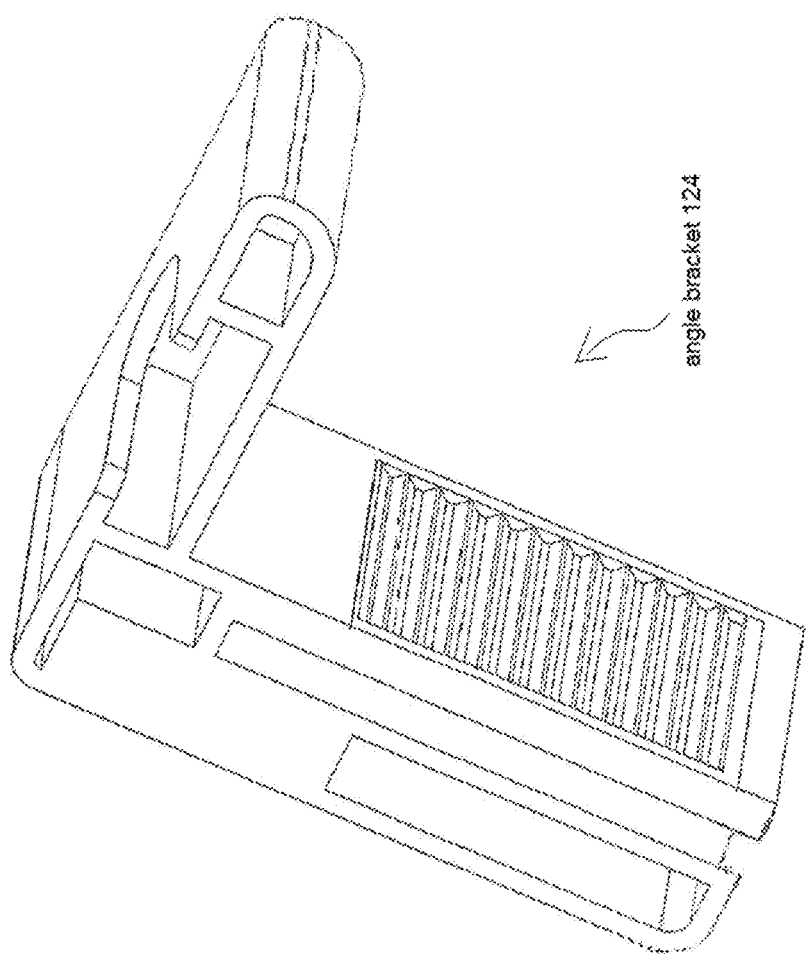
Figure 6D:
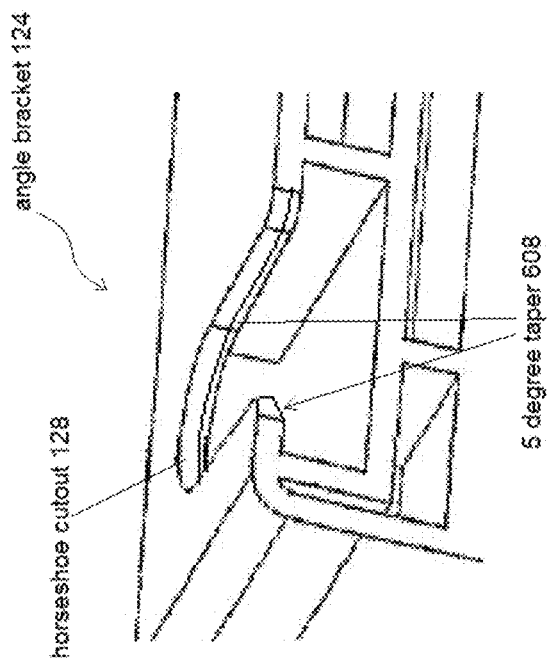
FIGS. 6C and 6D show macro and micro views of an embodiment of a horseshoe cutout.

The thick disk 116 is located both at a bottom and a side of the doughnut 112. The thick disk 116 is manufactured to have a tapered interior surface (doughnut-facing surface), which provides a snug fit, but also permits the doughnut 112 to rotate when attached to the angle bracket 124. In an embodiment, a taper of 5 degrees from perpendicular could be used for the thick disk 116, although other tapering could also be used. An example 5 degree taper 608 is shown in FIG. 6D. While the taper 608 is shown built into the horseshoe cutout 128, a similar taper is also located on the thick disk 116.

Next, the locking bump 120 is located at the center of an exterior-facing surface of the thick disk 116. This locking bump 120 locks the doughnut 112 into the angle bracket 124.

The angle bracket 124 is the main backbone of the clamp 102. All parts discussed herein attach to the angle bracket 124, either directly or indirectly. In an embodiment, the angle bracket 124 is constructed of ABS plastic, although other materials could also be used. The angle bracket 124 has an angle of e.g. 90 degrees, with a larger portion forming one leg, and a smaller thinner portion forming the other leg, where the 90 degree angle is formed by the joining of the two legs.

At least two horseshoe cutouts 128 are located within the angle bracket 124, one on the bottom, and one on the upright angle. Both cutouts provide mating surfaces for engaging a thick disk 116, depending on how the user operates the system 100. The interior surfaces of the horseshoe cutouts 128 are angled at 5 degrees to make a tight snug fit with the thick disk 116 but also to let the doughnut 112 swivel within the angle bracket 124.

As shown at least within FIG. 2, a small concave surface or "dent" 9 is located within the angle bracket 124. This concave surface 132 allows the doughnut 112 to be locked in place when a doughnut 112 and an angle bracket 124 are snapped together. As stated, when snapped together thus, the doughnut 112 is still free to rotate without concern over coming apart from the angle bracket 124. However, when not in use, the doughnut 112 and angle bracket 124 can be easily separated.

At least two guide slots 136 are located at each side of the angle bracket 124. These guide slots 136 provide a travel-path for a slider 144, which is attached to an opening in the angle bracket.

At a top of the base of the angle bracket are a plurality of teeth 140. In an embodiment, a total of 13 teeth can be used, although other numbers can also be used. The teeth 140 engage with the trigger 160 so as to allow the slider 144 to move within the angle bracket 124 when the rigger 16 is engaged with the teeth 140, but locks the slider 144 to the angle bracket 124 when the trigger 160 is released.

In an embodiment, the slider 144 can be fabricated from for example polypropylene, although other materials could also be used. The slider 144 may be molded in a 1-piece unibody construction, with a spring 13 then incorporated therein. The slider 144 has two feet on the bottom which engage into the guide slots 136, which allows the slider 144 to move within the angle bracket 124. This movement allows for adjustment in the opening-width of the angle bracket 124.

As stated, the face (or front) of the slider 144 has a slider spring 146 incorporated therein. The slider spring 146 can be molded at the same time as the slider 144, or can be molded separately and added during assembly. The slider spring 146 acts to either secure or release the clamp 102 when adjusted to do so by a user.

Within this disclosure, in various Figures there may be more than one implementation of the slider 144. For example, the slider 144 shown in FIGS. 2, 7, and FIGS. 15A and 15B may be slightly different from other illustrations. In these other illustrations, the slider 144 may be shown in simplified format for the purposes of brevity.

As shown in FIG. 2, the trigger mounts 152 act to secure the trigger 160 to the slider 144 by use of a roll pin 156. The trigger 160 may be constructed of polypropylene, and can be molded in one piece with a trigger spring 164 incorporated therein. The trigger 160 serves to lock in the teeth 140 and keep the slider 144 from moving (when a user selects to do so). The trigger 160 also releases the slider 144 so that the slider 144 can be adjusted.

The trigger spring 164 applies continual tension on the trigger 160, and is attached to the trigger through the pivot holes 168. During use of the system 100 for leveling, the trigger 160 remains in a "closed" (gripping) position, and is continually urged into this position by the trigger spring 164. During use for installing and relocating, the trigger 160 is moved into an open position by a user's fingers, which act to inhibit and overcome the force of the trigger spring 164.

Methods of Use

FIG. 3 shows a flowchart depicting an overview-only method 300 of using of the system 100. Further, FIG. 4 shows a flowchart depicting an detailed method 400 of using of the system 100.

STEP ONE 304: determine a desired position to attach the level 105. Slide the level 105 into the doughnut with the base of the level down, and the top of the level 105 facing up to the thumbwheel 108. Then, snug up the thumbwheel 108. The thumbwheel 108 has a mechanism for prevent over-snugging and prevents potential stripping of the threads 109 within the thumbwheel 108.

STEP TWO 308: determine a desired angle for attaching the level 105 (most often from the top). If from the top, snap the round disc on the base of the doughnut 112 into the base of the angle bracket 124. At this point, the opening and slider 144 should be facing downward. Then, move the angle bracket 124 so both brackets are facing the same way and the opening is parallel to the surface being clamped to.

STEP THREE 312: push the trigger 160 and then open/close the slider 144 until the clamp 102 grasps the specific clamping surface 106 desired to be leveled. A user can push the trigger 160 until the angle bracket 124 and slider 144 have bottomed out, that is, where the angle bracket 124 and slider 144 cannot move any further. A user will quickly learn how to sense this point has been reached by the fact that the angle bracket 124 and slider 144 cannot move any further. As such, over-tightening and over-clamping is avoided.

Further, the materials used in making the angle bracket 124 and slider 144 are chosen for their durability, resistance to mechanical forces, yet still promote smooth and stick-free movement of their various component parts.

Advantages

It is an advantage of the embodiments herein that, once the clamp 102 is set up to a predetermined width, it is not necessary to re-adjust that width each time a new clamping surface 106 is being clamped to. This is especially convenient when all the material being level is the same thickness.

One example might be construction framing using 2×4s. Once the clamp 102 is set up to a predetermined width, the entire clamp 102 and level 105 (combined) can simply be pulled off an earlier clamping surface 106a and moved to a next clamping surface 106b, and pushed onto that next clamping surface 106b. The clamp 102 will remain in place so that the user has two hands free to achieve the appropriate leveling.

FIG. 4 shows a flowchart of a detailed method 400 of using of the system 100.

Attachment of System 100

STEP 1 404 position the angle bracket 124 and the attached slider over a desired clamping surface 106.

STEP 2 408 move the slider 144 toward the clamping surface 106 until it compresses a slider trigger spring 164 that is part of the trigger 160 within the slider 144. The teeth 140 within the trigger 160 will hold the angle bracket 124 snug against the clamping surface 106. It is an advantageous feature that the slider 144 only needs to be snug against the clamping surface 106.

STEP 3 412 pull off the angle bracket 124 using the attached slider 144. At this point, the trigger 160 will hold everything in place.

STEP 4 416 slide the thick disk 116 that is part of the doughnut 112 into the horseshoe cutout 128 within the angle bracket 124. The locking bump 120 in the center of the thick disk 116 will then drop into the concave surface 132 located near but opposite the horseshoe cutout 128. This sequence and arrangement will have the effect of holding the doughnut 112 and angle bracket 11 snug, but will allow the doughnut 112 to swivel to accept the level 105.

STEP 5 420 slide the level 105 into the opening within the doughnut 112. The bottom of the level 105 (if one exists, many levels do not have an apparent bottom or top) should be positioned next to the base or an attached disk side of the doughnut 112. At this point, the combination doughnut 112 with angle bracket 124 should be locatable anywhere on the level 105. However, to get the best indication (usage) of level-ness, its better to locate the combination as close to the ends of the level as possible.

STEP 6 424 Now that the above steps have been accomplished, adjust the knurled knob 108 downwards until the thrust pad 110 (shown in FIG. 2) is snug against a top surface of the level 105. One end of the level 105 should now be securely and non-movably located within the system 100.

STEP 7 428 Do the same steps 1-7 for the other end of the level 105. Both ends of the level 105 should now be securely and non-movably located within the system 100.

STEP 8 432 With both level claim 19 thus in-position, an example embodiment of the system 100 would be where both angle brackets 124 are facing the same direction. However, even in embodiments of usage where both angle brackets 124 are not facing the same direction, the angle bracket 124 and slider 144 can be rotated by hand. The locking bump 120 will hold these items in-place.

STEP 9 436 Holding both the level 105 and doughnut 112 with one hand, the other side of level with doughnut 112 with the other hand, position the angle bracket 124 and slider 144 over the clamping surface 106. Then, push until the slider 144 "bottoms out" or indicates (gives tactile feedback) that it cannot be moved further. The spring 13 on the slider 144 will hold the level 105 in-place so that it can give accurate indications of level-ness.

Removal of System 100

STEP 10 440 It is an advantage of the embodiments herein that, once-installed, the level 105 and all attachments thereto can be slid off easily, with no need to release the trigger 12. That is valuable for situations with multi-repeated leveling tasks on the same sizes of clamping surfaces 106. If the level 105 are to be used on same-size materials, over and over again, no adjustments are needed, and the system 100 can simply be pushed onto the new clamping surface 106 until the angle bracket 124 bottoms out or indicates (gives tactile feedback) that it cannot be moved further.

STEP 11 444 If a new clamping surface 106 is anticipated, either larger or smaller, then dis-engage the trigger 160 so that the slider 144 can open up.

Method of Manufacture

FIG. 5 shows a flowchart depicting a method of manufacture of the system 100. A first step is molding/machining/fabricating the doughnut 112, angle bracket 124, slider 144, and trigger 116. One possible non-limiting way to achieve this is by injection molding.

Figure 9:
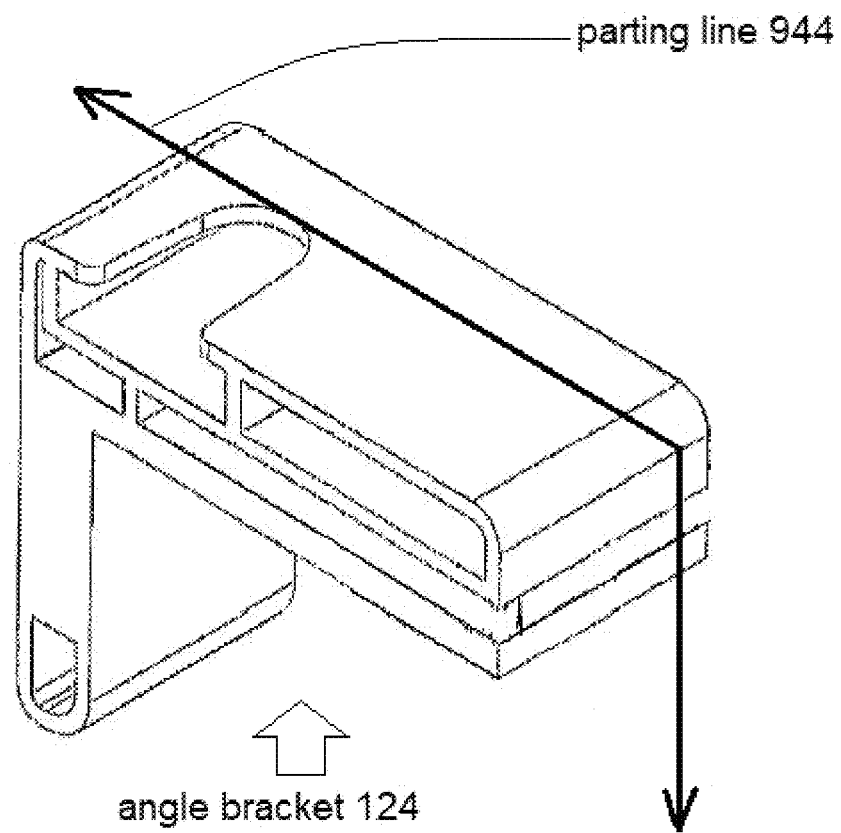
FIG. 9 shows details of an embodiment of an angle bracket.

In an embodiment, all four of the doughnut 112, angle bracket 124, slider 144, and trigger 116 are formed in two portions (usually halves), and then pressed together. However, as shown in FIG. 9, the angle bracket 124 is not necessarily formed in exact halves. As shown by the parting line 944 (the line indicating which of the two portions come from which mold), the two portions are clearly not equal in size and thus not exactly "halves" as that expression is conventionally used. Instead, the portions of the angle bracket 124 are non-equal because it is best that only one portion must contain the horseshoe cutout 128 in its entirety. Accordingly, because of the size of the horseshoe cutout 128, one portion is much larger than the other. This feature has two advantages, the first advantage being that when a cut-out is all in one portion, the mold equipment can be less complex and thus less expensive. Another advantage is that its easier to pop the finished portion out of the mold.

Figure 6C:
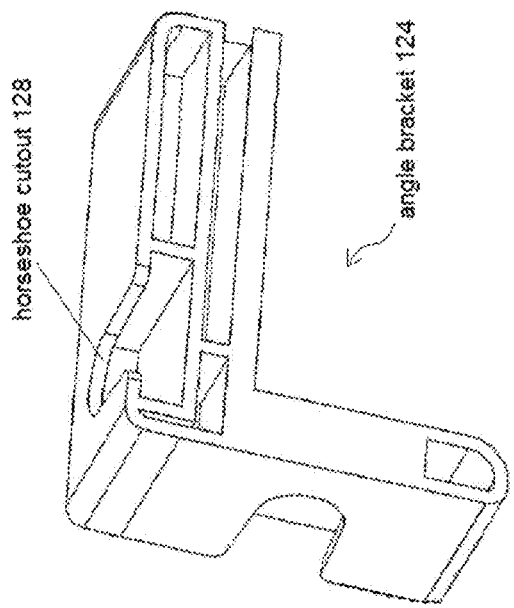

FIGS. 6C and 6D show another manufacturing advantage. FIG. 6D is an enlarged portion of FIG. 6C. From FIG. 6D it is apparent that a 5 degree taper 608 is built into the horseshoe cutout 128. This feature also provides two advantages, but partly different from the above. The first advantage is the 5 degree taper 608 makes it easier to insert and withdraw the thick disk 116 and also provide superior engagement between the locking bump 120 and concave surface 132. A second advantage is, as discussed earlier, the 5 degree taper makes it easier to pop the various portions of the angle bracket from its mold. In an embodiment, the thick disk 116 is also fitted with a 5 degree taper.

In working with injection molding, sometimes the plastic warps and does not cure properly if the thickness exceeds a predetermined amount. In an embodiment, this thickness might be ⅛ of an inch. FIGS. 6A and 6B show one way the embodiments herein address this problem. Specifically, the location of apertures 604, and thicknesses A, B, C of the various reinforcing walls, are chosen to be below the predetermined amounts known to be subject to warping and improper curing.

Next, another manufacturing improvement will be noted. Specifically, the threaded insert nut 104 can be snapped in, or pressed in, after molding. Like many of the other parts discussed herein, the doughnut 112 is also made in two halves, using e.g. injection molding, and then is put together in a press.

However, it is desired to avoid forcing extra holes into a molding process, as this increases complexity and expense. To address this, there can be located a nut-slide (rather than a hole) in the doughnut 112, and take advantage of a gap (not a hole) in the two portions when they meet each other. This nut slide (not shown) could be for example a type of groove in each of the two portions that form the doughnut 112. When the two separate portions of the doughnut 112 are popped out of their respective molds and then pressed together, a type of hole would be present, but where the hole was not formed as part of the molding process. Specifically, the nut slide might be made from a small groove on a first portion, and another groove on a second portion. When the two portions are pressed together to form a doughnut 112, they would form a type of hole or location to seat and host the threaded insert nut 104.

This hole does not have to be exact in size or contour, as most of the force applied to this region of the doughnut 112 will be absorbed by the threaded insert nut 104. Once the threaded insert nut 104 is put in, the thrust pad 110 (attached afterward) will prevent the threaded insert nut 104 from falling out.

Figure 10:
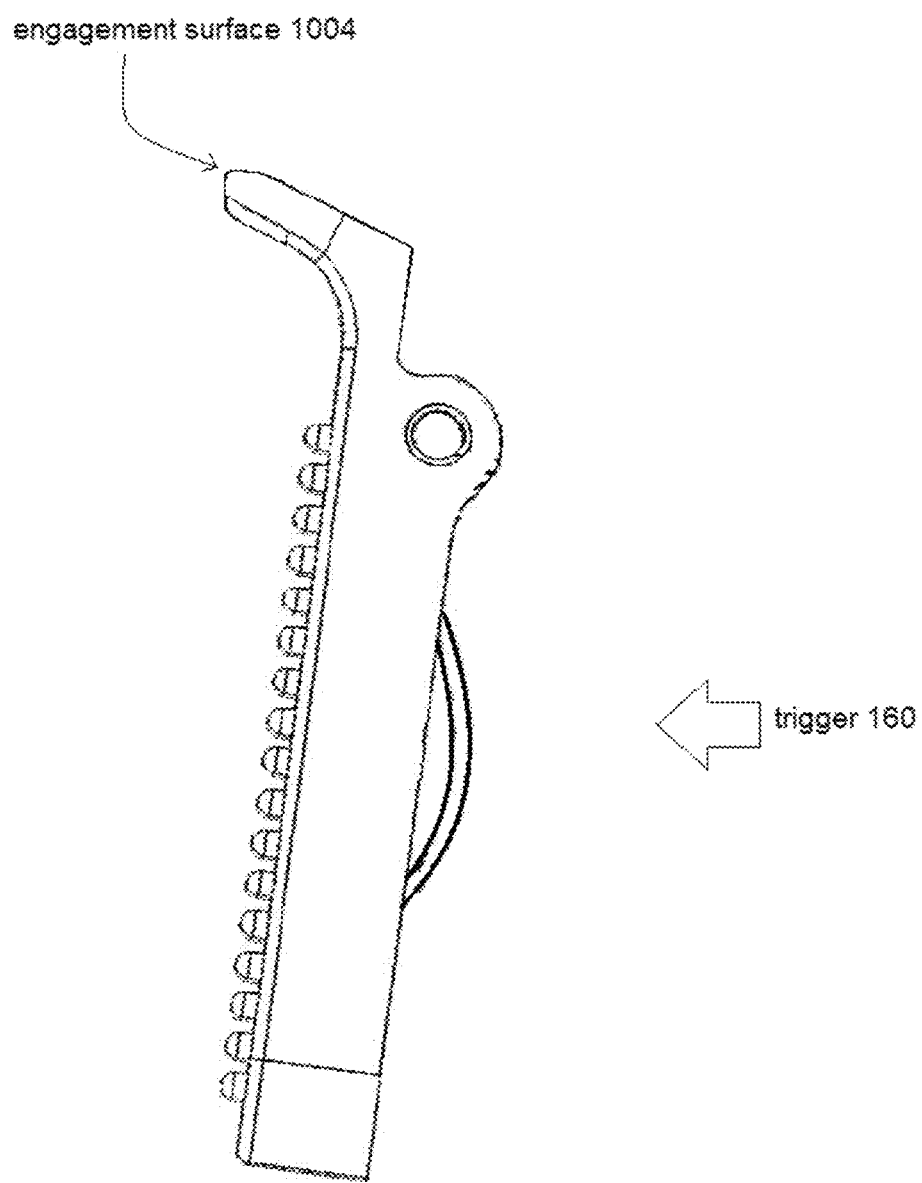
FIG. 10 shows details of an embodiment of a trigger.

Yet another manufacturing advantage is shown in FIG. 10. The engagement surface 1004 of the trigger 1600 is formed to have geometry suitable for achieving secure and stable engagement with the teeth 140 of the angle bracket 124. The geometry shown in FIG. 10 is for example purposes only, so that the embodiments herein should not be considered as limited thereto. The desired effect is that the engagement surface 1004 has a rounded contour to reduce the expected wearing down through typical usage, but yet still remain suitable and effective for holding the trigger 1600 in the desired position while being gripped by the teeth 140.

Figure 8:
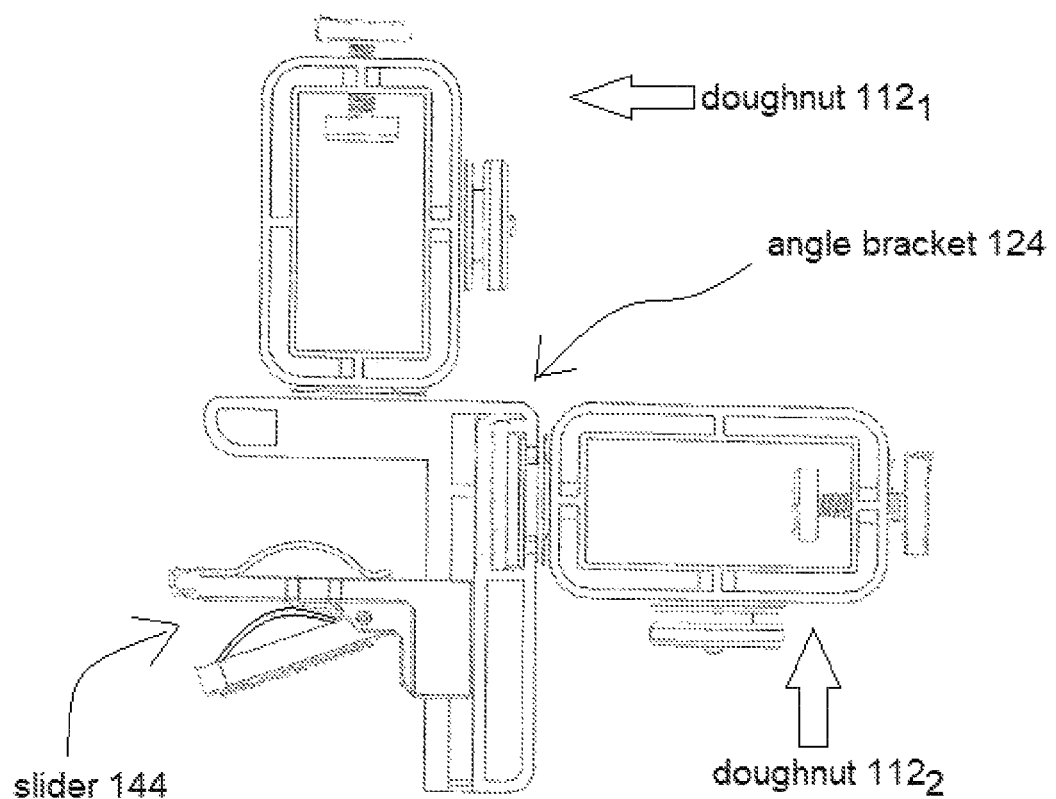
FIG. 8 shows an embodiment of an angle bracket holding two doughnuts.

Regarding remaining factors of using the system 100, the clamps 102, and the various portions therein, it is anticipated that a typical construction site may have an abundance of systems 100, in which the parts may be kept in a toolbox, interchanged, replaced as things wear out, or exchanged for other reasons. To that end, FIG. 8 shows a situation in which a single angle bracket 124 is attached to two separate doughnuts 112. While such an arrangement may have only limited practical usage, there may be instances in which there is limited space and limited ability to carry a lot of loose parts. In such a case, the ability to attached two separate doughnuts 112 to a single angle bracket may be convenient for carrying, transport, and/or storage purposes.

FIG. 11 shows an example of swiveling the doughnut 112 to ensure suitable visibility of the level 105 including when attached to more than one attachment surfaces. Specifically, FIG. 11 shows an example where the attachment surfaces 106 are non-parallel and non-perpendicular.

Figure 12:
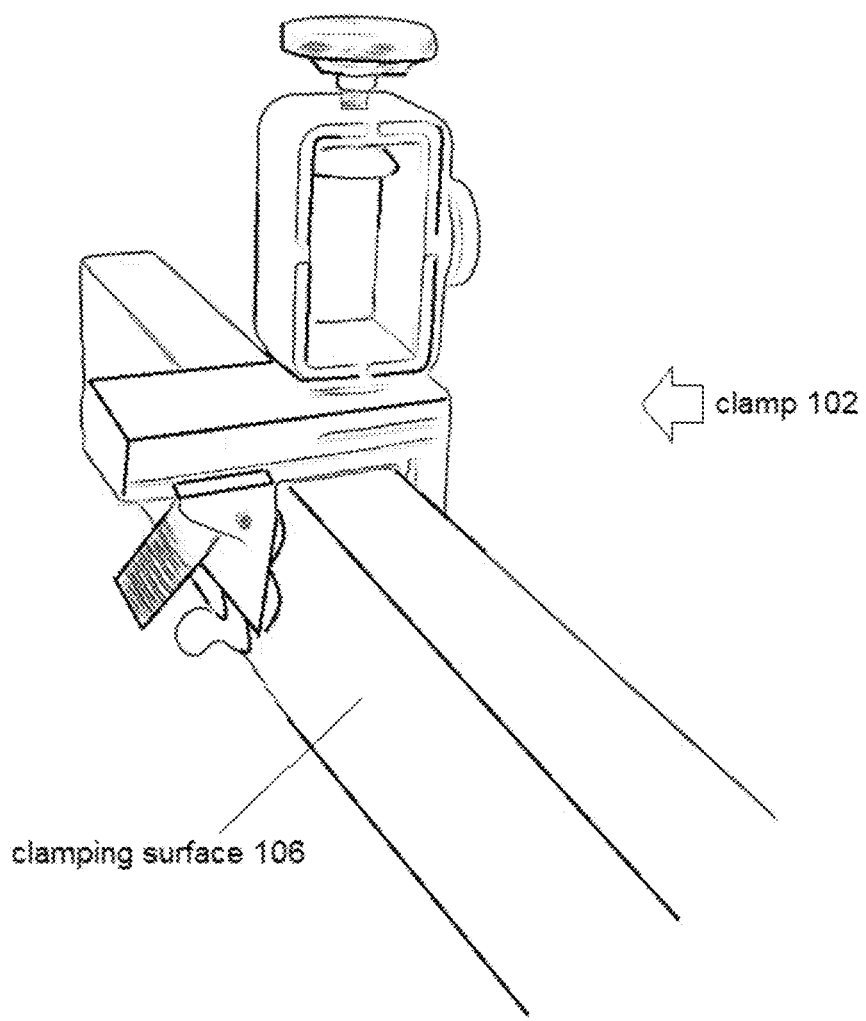
FIG. 12 shows a perspective view of a clamp attached to a clamping surface.
Figure 13:
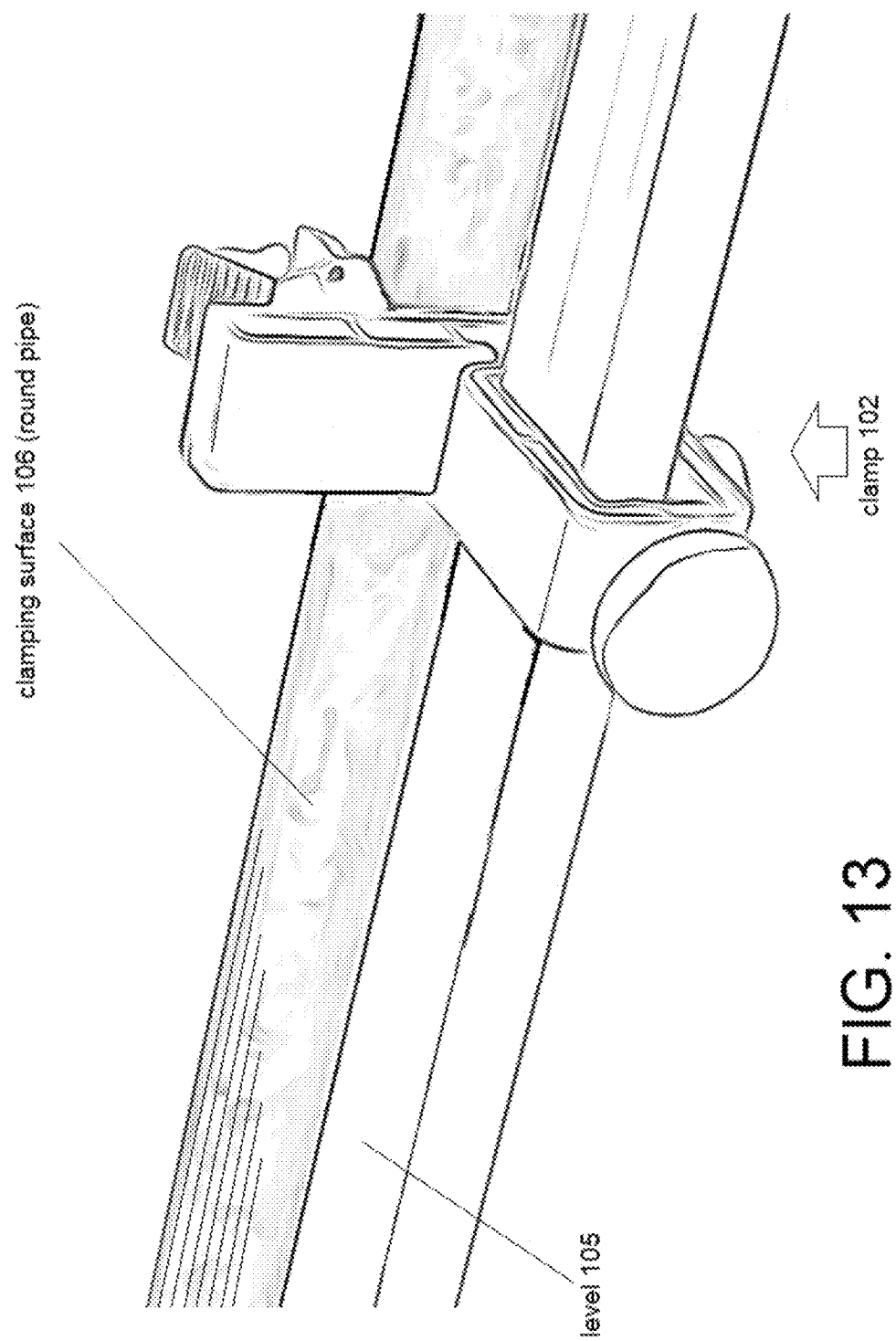
FIG. 13 shows an embodiment of a clamp attached to round pipe.
Figure 15B:
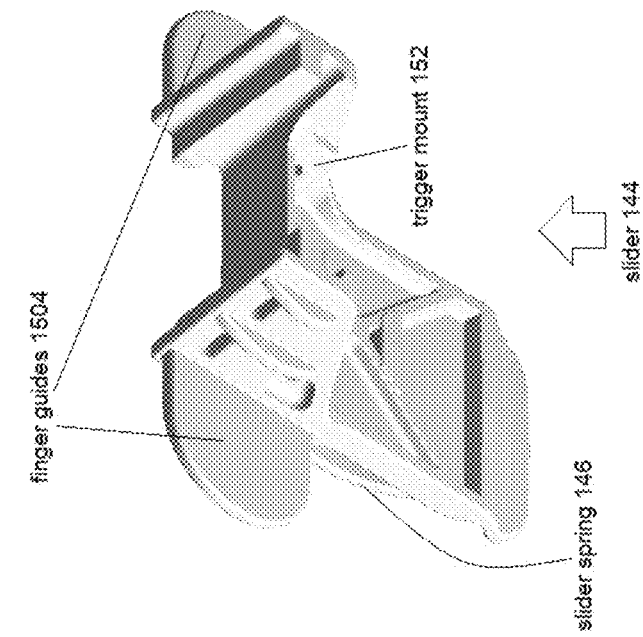
FIGS. 15A and 15B show an embodiment of a slider.
Figure 15A:
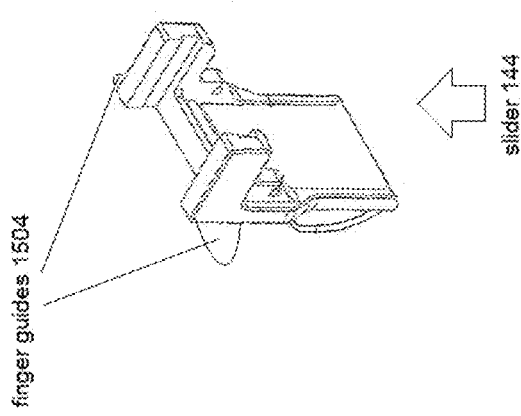

FIG. 12 shows a perspective view of a clamp 102 attached to a clamping surface 106. FIG. 13 shows an embodiment of a clamp 102 attached to round pipe as a clamping surface 106. FIG. 14A shows an embodiment of a system 100 vertically attached to a door, and FIG. 14B shows an embodiment of a system horizontally attached to a door. FIGS. 15A and 15B show an implementation of the slider 144 which includes finger guides 1504. The finger guides 1504 assist in moving the slider 144, and may be grasped either by one hand or by both hands.

What is claimed is:

1. A method of operating a level-system for obtaining level-indications, comprising:

sliding a thick disk that is part of a first doughnut into a horseshoe cutout within a first angle bracket;
positioning a locking bump located in the center of the thick disk to be located into a concave surface of the first angle bracket;
holding the first doughnut and the angle bracket to be snug, but allowing the first doughnut to swivel to accept a removable level suitable for giving a visual level indication;
sliding the removable level into an opening within the first doughnut;
positioning a first end of the removable level within the doughnut, the combination of the doughnut and the angle bracket now being locatable anywhere on the removable level;
adjusting a first knurled knob downwards until a first thrust pad is snug against a surface of the removable level;
performing the above steps for a second end of the removable level with a second angle bracket attached to a second doughnut having a second knurled knob;
attaching a first ratcheting slider to the first angle bracket;
attaching a second ratcheting slider to the second angle bracket, thereby forming the level-system;
positioning the first angle bracket and the first ratcheting slider over a first portion of a desired first clamping surface;
positioning the second angle bracket and the second ratcheting slider over a second portion of the desired first clamping surface;
adjusting the first and second ratcheting slider to have sufficient gap-space to admit the desired first clamping surface wherein the first and second sliders movement is entirely straight line linear;
pushing the first and second angle brackets onto the first and second portions of the first clamping surface;
moving the first and second ratcheting sliders toward the first clamping surface until the first and second ratcheting sliders indicate tactile feedback that the first and second ratcheting sliders cannot be moved further, thereby ensuring that both ends of the level-system are securely attached by spring-pressure of a slider spring to the first clamping surface, wherein the first and second ratcheting sliders movement is entirely straight line linear;
obtaining visual assurance from removable level whether the first clamping surface is at a proper level-ness;
the level-system remaining in place thereby permitting the user having the two hands free to achieve the appropriate leveling if necessary;
the ratcheting slider remaining in place due to a ratcheting effect as well as the pressure from the slider spring;
without making any adjustments to the level-system, pulling the level-system entirely off from the first clamping surface;
without making any adjustments to the level-system, pushing the level-system onto a second clamping surface having the same width as the first clamping surface;
obtaining visual assurance from the level whether the second clamping surface is at a proper level-ness; and
the level-system remaining in place thereby permitting the user having the two hands free to achieve the appropriate leveling if necessary.

2. The method of claim 1, further comprising;
repeatedly engaging, disengaging, and re-engaging the thick disk with a 5 degree taper within the horseshoe cutout.

3. The method of claim 2, further comprising:

During non-use situations of the level-system, transporting and storing the level-system in a fully-dis-assembled state, in which the thick disk is completely separated from the horseshoe cutout within the angle bracket; and At such time as a usage-situation of the level system arises, repeatedly engaging, disengaging, and re-engaging the thick disk with a 5 degree taper within the horseshoe cutout.

4. The method of claim 1, further comprising;

swiveling the first doughnut to ensure suitable visibility of the level including when attached to more than one clamping surfaces.

5. The method of claim 4, further comprising;

the more than one clamping surfaces being non-parallel and non-perpendicular.

6. The method of claim 1, further comprising:

moving the first sliders and the second slider through a pair of straight-line linear guide slots within the first and second angle brackets; and the first and second sliders traveling within a straight line linear path within the corresponding linear guide slots.

7. The method of claim 1, further comprising:

the first and second sliders directly contacting the first and second clamping areas.

8. The method of claim 1, further comprising:

the first doughnut not touching the second donut;

the first and second doughnuts swiveling to achieve alignment with the first clamping surface.

9. The method of claim 1, further comprising:

Configuring the first and second ratcheting sliders to each have the slider spring attached therein.

10. The method of claim 9, further comprising:

the slider spring applying pressure-force to the first clamping surface in a first direction;

achieving the step of pulling the level-system entirely off using pressure-force in a second direction; and arranging that the second direction is 90 degrees perpendicular to the first direction.

* * * * *